United States Patent
Patel et al.

[11] Patent Number: 5,768,685
[45] Date of Patent: Jun. 16, 1998

[54] METHOD AND APPARATUS FOR CONVERTING SIGNALS IN A BASE STATION RECEIVER

[75] Inventors: Kumud S. Patel, Germantown; Daniel R. Wending, Darnestown, both of Md.

[73] Assignee: Hughes Electronics, Los Angeles, Calif.

[21] Appl. No.: 570,067

[22] Filed: Dec. 11, 1995

[51] Int. Cl.$^6$ ................................................. H04B 7/185
[52] U.S. Cl. ........................ 455/13.3; 455/20; 455/22; 455/137; 455/189.1; 455/131; 455/133; 455/190.1
[58] Field of Search ................. 455/54.1, 56.1, 455/33.1, 32.1, 31.1, 33.3, 137, 142, 189.1, 190.1, 130, 131, 133, 13.3, 20, 22; 379/59, 60

[56] References Cited

U.S. PATENT DOCUMENTS

| | | | |
|---|---|---|---|
| 3,633,107 | 1/1972 | Brady | 455/137 |
| 4,519,096 | 5/1985 | Cerny, Jr. | 455/137 |
| 5,243,598 | 9/1993 | Lee | 455/33.1 |
| 5,530,925 | 6/1996 | Garner | 455/273 |
| 5,548,813 | 8/1996 | Charas et al. | 455/33.3 |
| 5,557,603 | 9/1996 | Barlett et al. | 455/137 |

*Primary Examiner*—Donnie L. Crosland
*Attorney, Agent, or Firm*—Wanda Denson-Low; John Whelan

[57] ABSTRACT

An apparatus and method for use in receiving radio frequency (RF) signals having varied frequency bands from a n-sector base station antenna, and converting the RF signals to intermediate frequency (IF) signals for allocation to all available receiver radio channels. By employing a combiner and power splitter/divider, the IF signals from the converters in each sector of the receiver can be accessed by every receiver radio channel. Accordingly, remote communications users placing calls in high traffic sectors will have access to all available radio communications channels.

16 Claims, 4 Drawing Sheets

METHOD AND APPARATUS FOR CONVERTING SIGNALS IN A BASE STATION RECEIVER

BACKGROUND OF THE INVENTION

Conventional remote communications systems include a base station which contains receivers for receiving signals from remote units, and transmitters for transmitting the remote signals to their destination. Typically, the base station utilizes multiple communications channels which are allocated to various receive antennas.

One architectural structure for the base station is the sectorized cell structure. One of the most common sectorized cell structures divides each cell into 3 sectors, wherein each sector represents a particular area, such as a particular area of a city.

FIG. 1 shows a typical base transceiver station (BTS) receiver architecture. It is comprised of receiver multi couplers (RMCs) 31, power splitters/dividers 26 and radio channel units (RCUs) 32. In each sector, the radio frequency (RF) signal from the antenna 10 is filtered and amplified by the RMC 31. The amplified signal is then divided by the power splitter/divider 26 and distributed to the RCUs 32. The RCUs 32 operate in specific RF bands, for example, in the AMPS system, the operational frequency range is 824–849 Mhz (25 Mhz).

There are a fixed number of dedicated RCUs per sector. The RF signals from the RMCs are distributed to every RCU in a particular sector. In the case of a diversity receiver, an additional antenna is used on the same sector that also has a dedicated RMC. The RCU is capable of accepting additional signals from the diversity path.

Conventional base station receiver architectures that implement a fixed allocation of RCUs per sector have several drawbacks. In a high traffic sector, the receiver's radio channels are typically in constant use. Thus, in a high traffic sector all of the available receiver channels may often be busy. As a result, a remote communications user may have to call many times before securing an available channel. Meanwhile, in a low traffic sector where few calls are placed, one or more channels may remain idle. Because the base station receiver's communication channels are physically connected to particular sectors, high traffic sectors cannot access idle channels in a low traffic sector. The result is an ineffective use of resources and a reduction in the overall efficiency of the remote communications system.

Another drawback to conventional base station receiver architectures pertains to the operating frequency range of the base station receiver. For example, in North America, all cellular systems operate in the same frequency band, i.e. 824–849 Mhz. Remote communications systems in other countries, however, operate in other frequency bands such as 450 Mhz wireless. Currently, adaptation to an 824–849 Mhz operating frequency band requires modification of large pieces of equipment and results in increased base station hardware costs.

Accordingly, there exists a need for a device that will allow remote communications users in any sector access to all base station receiver radio channel units. Additionally, a need exists for a device that will accommodate multiple operating frequency bands.

SUMMARY OF THE INVENTION

The present invention provides a new design of an n-sector receiver for the base station. Specifically, the invention comprises a novel device and method which allow any given base station receiver radio channel unit access to any RF channel from any sector with electronic control and without any manual intervention.

In another aspect of the invention, a device and method are provided which accommodates multiple frequency bands. Thus, the present invention will allow one remote communications system to support users operating in different frequency bands and will significantly reduce the amount of new hardware required for adaptation to the different operating frequencies.

More particularly, the present invention comprises a base station receiver which receives RF signals in a particular frequency band from remote communications units via a base station receiver n-sector antenna. In each sector, the RF signal output from the receiver antenna is received by a converter which converts the RF signal into an intermediate frequency (IF) signal in a different frequency band from frequency bands in the other sectors. The IF signals from each sector are combined by a power combiner to produce a composite IF signal. A power splitter/divider receives the IF composite signal and allocates the composite signal to a plurality of radio channel units.

In a preferred embodiment, the RF signals from the base station receiver n-sector antenna are translated to IF signals using a mixer and a synthesizer. In each sector, the respective mixer receives the RF signal from the receiver antenna and mixes it with a highly stable local oscillator signal generated by the respective synthesizer to produce a corresponding IF signal.

The present invention increases the overall efficiency of remote communications systems. Users placing remote calls in high traffic sectors have access to all potentially available radio communications channels.

The invention itself, together with further objects and attendant advantages, will be understood by reference to the following detailed description, taken in conjunction with the accompanying drawings.

DETAILED DESCRIPTION OF THE PRESENTLY PREFERRED EMBODIMENTS

Figure 1:
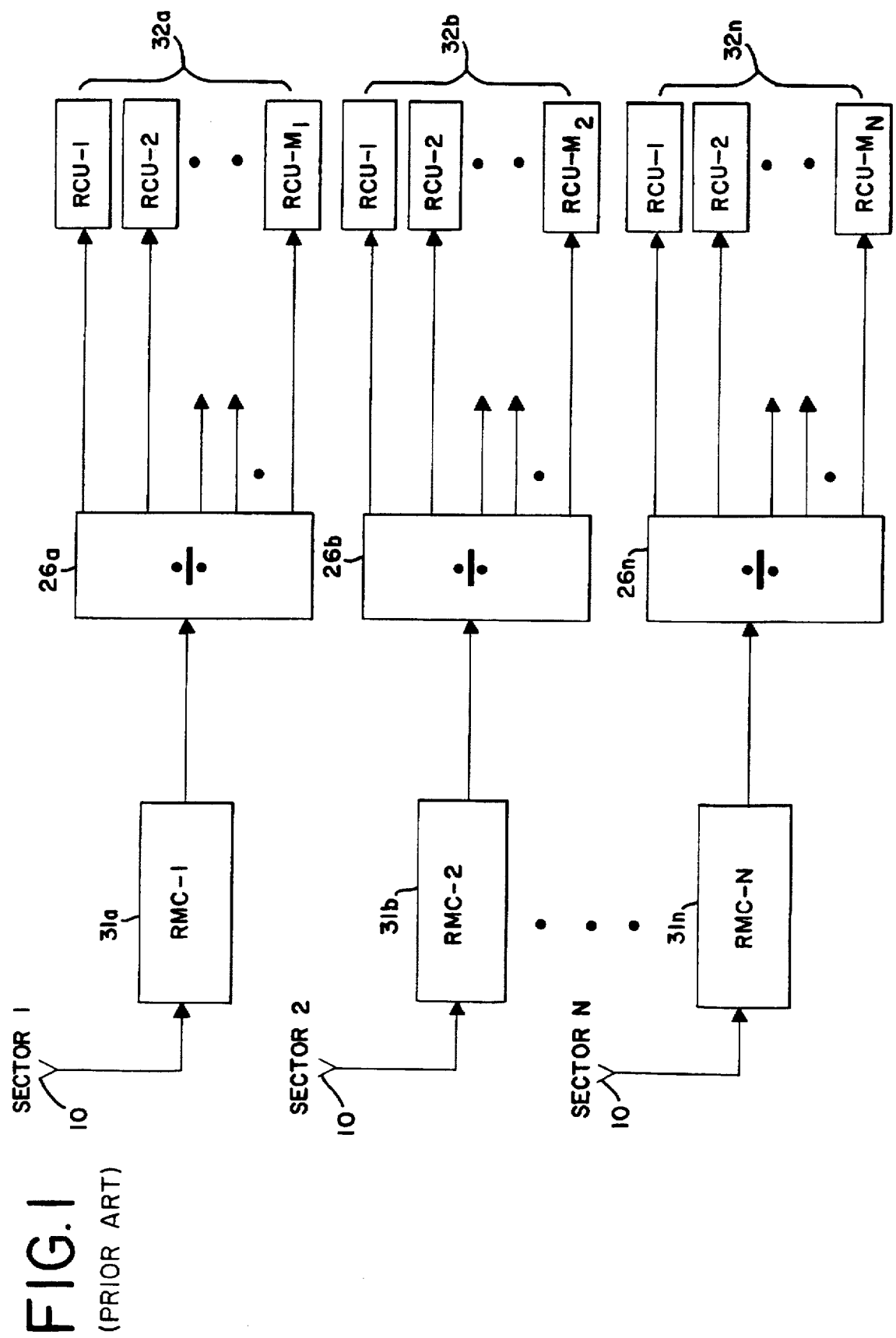
FIG. 1 is a high level block diagram of a typical BTS receiver architecture.
Figure 2:
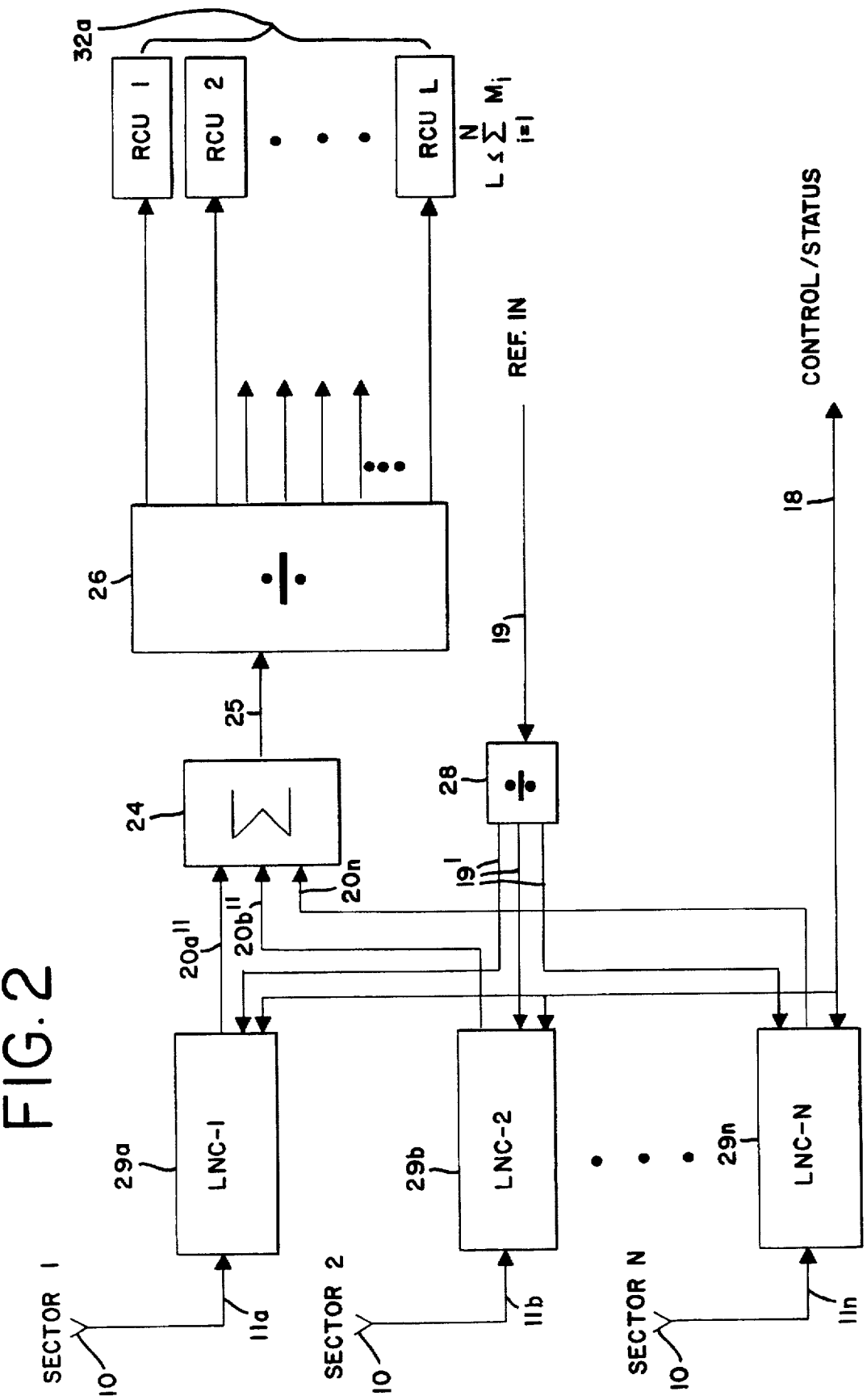
FIG. 2 is a high level block diagram of a preferred embodiment of the proposed BTS receiver architecture according to the present invention.

A preferred embodiment of the base station receiver which utilizes the present invention is shown in FIG. 2. In the illustrated embodiment, the base station utilizes the sectorized cell structure. The sectorized cell structure can be configured such that each cell is divided into three sectors, wherein each sector represents a particular area, such as a particular area of a city. It will be recognized, however, that the cell structure can be divided into as many sectors as are needed for a particular arrangement. Therefore, the following is described with respect to an "n" sector system, one example of which is a three sector system. In the three sector system, there are usually two receive antennas per sector and one transmit antenna per sector.

As illustrated in FIG. 2, the base station receiver is comprised of low noise converters (LNCs 29A–29N), a power combiner 24, a power splitter/divider 26 and RCUs 32. In each sector, the LNCs 29A–29N filters, amplifies and converts/translates the RF signals 11 from the antenna 10 to specific intermediate frequency (IF) signals 20"(indicated by 30a, 20b, etc. in FIG. 2). Each LNC 29A–29N has its own distinct frequency band. The non-overlapping IF signals 20" from all sectors (in the case of one antenna per sector) are combined using the power combiner 24 to produce a composite signal 25. The composite signal 25 is then divided using the power splitter/divider 26 and distributed to a pool of RCUs 32.

The operation described above is further illustrated using the following example. North American cellular users generate RF signals in an 824–849 Mhz frequency band. In a three sector system, the converter 29A–29N translate the 824–849 Mhz RF band into three predetermined IF bands, such as, 200–225 Mhz, 245–270 Mhz, and 290–315 Mhz. The combiner 24 receives the IF bands from the three sectors and adds them to produce a composite signal 25 having a frequency band of 200–315 Mhz. The power splitter/divider 26 receives the composite signal 25 and allocates the 200–315 Mhz band to each base station receiver RCU 32.

The IF bands are selected according to the operational flexibility of the base station RCUs 32. The RCUs 32 must have the capability to tune to any frequency in the three ranges selected. The RCUs in the present invention can operate over a wider frequency range than those in the typical BTS architecture. In the present invention, the operating IF range is usually greater than the number of sectors multiplied by the RF range. For example, in the case of the AMPS system with three sectors (1 antenna per sector), the RCU receiver operates over more than a 75 Mhz band (3×25 Mhz+guard). The guard represents an offset between adjacent frequency bands. In the present example, the guard band 30 (FIG. 4) is 20 Mhz. This guard band 30 prevents interference between the sector's IF signals 20".

In the case of a diversity receiver, an additional antenna is used on the same sector that also has a dedicated LNC. The RF signals from the LNCs are distributed to every RCU. The RCUs are also capable of accepting additional signals from the diversity path. Unlike a typical BTS architecture, there is no fixed number of dedicated RCUs per sector. Instead, there is a pool of RCUs that is shared by all sectors. The allocation depends on the demand. One scanning receiver can be shared by all sectors. Thus, the number of scanning receivers needed for the entire BTS is minimized.

Figure 3:
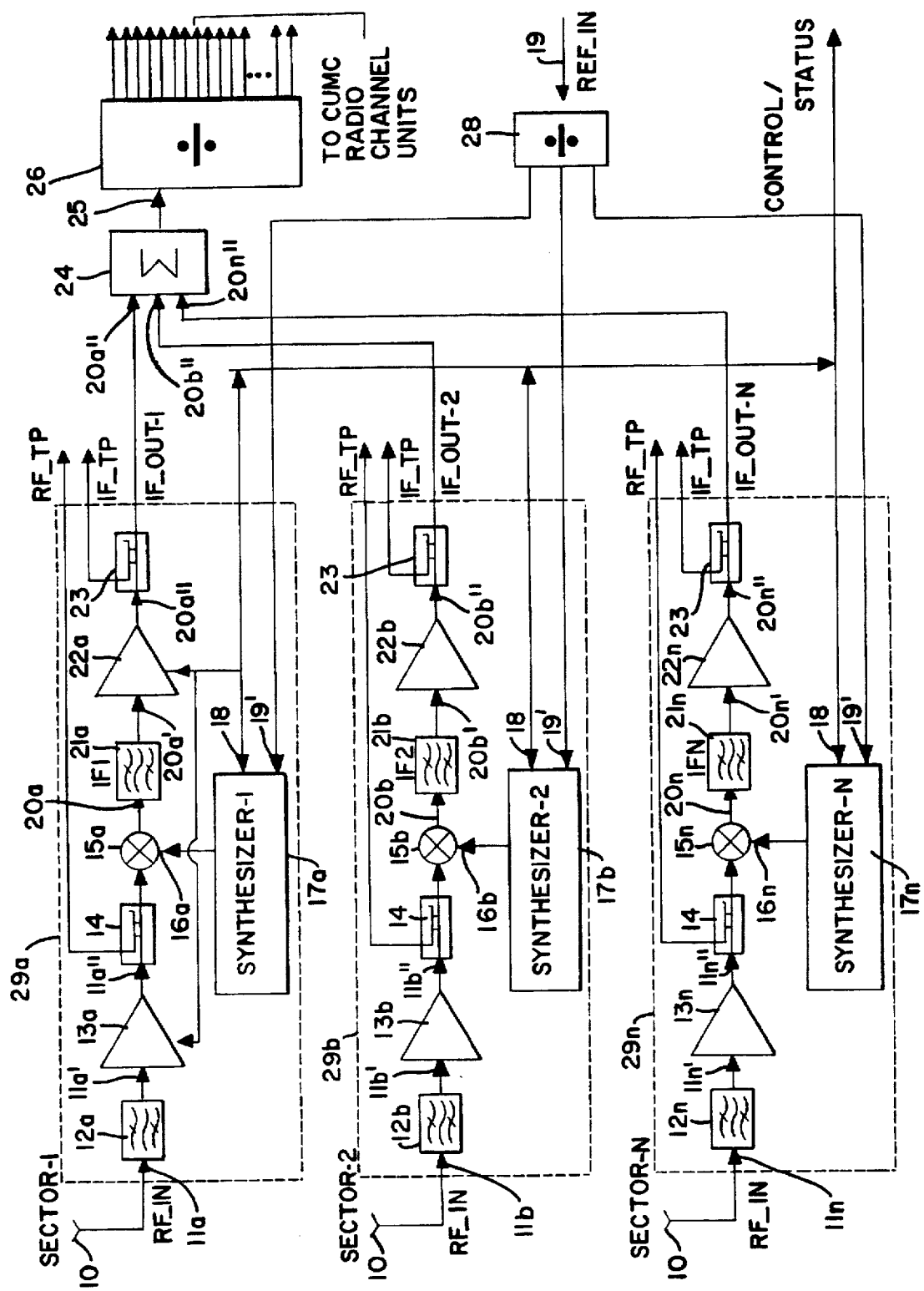
FIG. 3 is a schematic illustration of a preferred embodiment of the BTS receiver architecture according to the present invention.

FIG. 3 provides a more detailed illustration of a preferred embodiment of the invention. With the exception of the antenna 10, the components shown in FIG. 3 are off-the-shelf devices commonly known in the art. The antenna 10 should be chosen according to the physical environment in which the base station receiver will operate.

Rx band pass filter 12 receives the signal from the n-sector antenna 10 and removes out of band signals. This is necessary, for example, if the antenna 10 is mounted on the roof of a building, where the antenna 10 may pick up extraneous signals such as airport signals and television signals. The filter 12 removes these extraneous signals and passes only the RF signals from remote communications units. The filter 12 is coupled to a low noise amplifier 13 which amplifies the filtered RF signal 11'. A coupler 14 is provided to verify the strength of the amplified RF signal 11".

A frequency translator comprised of a high dynamic range mixer 15 and a synthesizer 17 translates the signal 11" from the amplifier 13 to an IF signal 20. The mixer 15 receives the amplified RF signal 11" and mixes it with the highly stable synthesizer local oscillator output 16 generated by the synthesizer 17 to produce an IF signal 20.

In one embodiment, the mixer 15 produces an IF signal 20 equal to the difference between the synthesizer output 16 and the amplified RF signal 11". An IF band pass filter 21 then receives the IF signal 20 from the mixer 15, removes other mixing products and other noise and passes only the desired IF band to a second amplifier 22. The second amplifier 22 amplifies the signal 20'. After the IF signal 20' is amplified, a second coupler 23 is provided to verify the signal strength of the amplified IF signal 20" before the signal is sent to the combiner 24.

As an example, if the RF band in sector 1 is 824–849 Mhz, and the desired IF band is 200–225 Mhz, the synthesizer 17a is programmed by the base station master reference via Control/Status 18 to output 624 Mhz. (624 Mhz subtracted from 824 Mhz is 200 Mhz. 624 Mhz subtracted from 849 Mhz is 225 Mhz.) Similarly, if the RF band in sector 2 is 824–849 Mhz, and the desired IF band is 245–270 Mhz, the synthesizer 17b is programmed to output 579 Mhz. Finally, if the RF band in sector 3 is 824–849 Mhz, and the desired IF band is 290–315 Mhz, the synthesizer 17n is programmed to output 534 Mhz. The synthesizer output 16 is kept stable by a high stability frequency reference 19 generated by the base station master reference. The frequency reference 19 is received by a power splitter/divider 28 via REF_IN and allocated to the synthesizer 17 in each sector.

Figure 4:
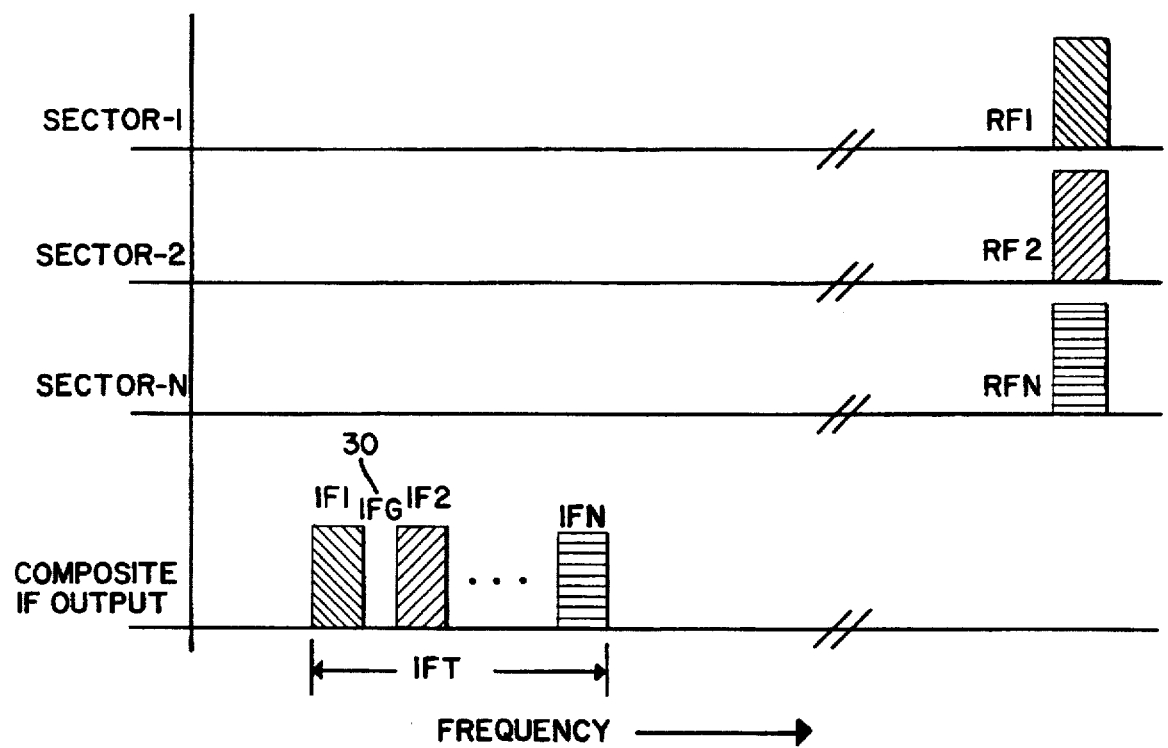
FIG. 4 illustrates an example of the translation of RF signals in the same frequency band to IF signals.

FIG. 4 illustrates an example of frequency spectrum translation for the three sector case. Each sector utilizes the same RF band (824–829 Mhz). Each converter converts the RF band to its appropriate IF band according to the following equations:

$$Sector\text{-}1 \to IF1L\text{--}IF1H = IF1,$$

$$Sector\text{-}2 \to IF2L\text{--}IF2H = IF2, \text{ and}$$

$$Sector\text{-}n \to IFnL\text{--}IFnH = IFn.$$

IFnL and IFnH are the lower and upper frequencies of the nth IF band, and IFn is the span. IF the guard band is IFG, then the composite IF band is given by:

$$IFT = IF1 + IFG + IF2 + IFG + \ldots IFn.$$

Where the RF bands received by each of the n sectors are the same, the IF bands will also be the same such that:

$$IFT = n*IFB + (n-1)*IFG.$$

The guard band 30 prevents interference between adjacent frequency bands.

The various sectors of the base station antenna 10 detect RF signals 11 having the same frequency band when remote communications users are operating in the same system (e.g., North American cellular or 450 Mhz Wireless). However, when some users are operating in North American Cellular, and others are operating in 450 Mhz Wireless, for example, the various sectors of the base station antenna 10 will detect RF signals 11 in different frequency bands. The present invention allows multiple RF bands to operate in the same cell cite, thereby using common resources and providing for more integrated applications.

Figure 5:
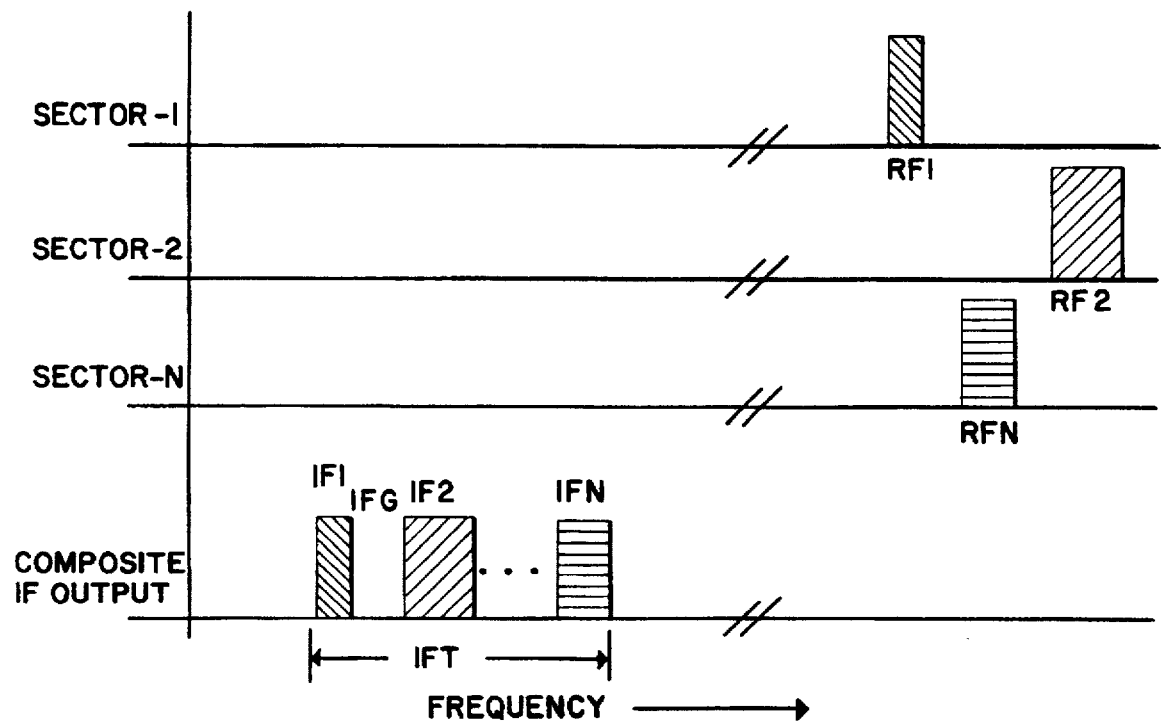
FIG. 5 illustrates an example of the translation of RF signals in different frequency bands to IF signals.

Translation of signals having different RF bands is illustrated in FIG. 5. RF signals 11" having different frequency bands are translated into a composite IF signal 25 consisting of a series of IF signals 20" having different frequency bands. The translation illustrated in FIGS. 4 and 5 is performed in the same manner; however, the synthesizer output 16 varies depending on the mixer 15 input RF signal 11" frequency band and the desired output IF signal 20 frequency band.

The base station receiver of the present invention provides numerous advantages. First, by allowing each base station radio channel access to signals from all sectors, the present invention provides: (1) operational flexibility, (2) dynamic selection switching of the sector by radio channel unit, (3) sharing of the scanning receiver between many sectors, (4) logistic simplicity, and (5) better allocation of resources. Second, by accommodating users operating in different frequency bands, the invention provides reduced base station hardware costs.

It should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A base station receiver for receiving radio frequency (RF) signals from a remote communications unit, the base station receiver comprising:

at least one antenna divided into n sectors, each sector receiving an RF signal from a remote communications unit and generating an antenna output RF signal;

a converter in each sector receiving the antenna output RF signal and converting the RF signal to an intermediate frequency (IF) signal, wherein the IF signal from each converter is in a frequency band from a first frequency band to an nth frequency band;

a combiner receiving the IF signals from the converter in each sector and adding the frequencies of the IF signals to produce a composite signal; and a power splitter/divider receiving the composite signal from the combiner and allocating the composite signal to a plurality of said remote communications units.

2. The device of claim 1 wherein each converter comprises:

a synthesizer generating an oscillator signal output; and a mixer receiving the oscillator signal and the RF signal and mixing the signals to produce the IF signal.

3. The device of claim 2 wherein the base station receiver comprises an IF band pass filter having a band which corresponds to the respective IF band, the filter receiving the mixer output IF signal and removing out of band signals.

4. The device of claim 3 wherein the base station receiver comprises an Rx band pass filter receiving the antenna output RF signal and removing out of band signals.

5. The device of claim 4 wherein the base station receiver comprises an amplifier receiving the antenna output RF signal and amplifying the signal.

6. The device of claim 2 wherein the base station receiver comprises an amplifier receiving the mixer output IF signal and amplifying the signal.

7. The device of claim 1 wherein the signals received by each sector are all in the same frequency band.

8. The device of claim 1 wherein the signals received by at least one of the sectors are in a frequency band different from the frequency bands of the signals in the other sectors.

9. A method for receiving signals in a base station receiver and distributing the signals to a plurality of receiver radio channel units, the method comprising:

receiving RF signals in an antenna from a remote communications unit and generating an antenna output RF signal;

dividing the signals received in the antenna into n sectors such that each sector receives an RF signal;

in each sector, converting the RF signal to an IF signal, wherein the IF signal in each sector is in a frequency band from a first frequency band to an nth frequency band;

combining the IF signals from each sector to produce a composite signal; and dividing the composite signal to allocate the composite signal to a plurality of said radio channel units.

10. The method of claim 9 wherein the step of converting comprises generating an oscillator signal and mixing the oscillator signal with the RF signal to produce the IF signal.

11. The method of claim 10 further comprising the step of filtering the IF signal to remove out of band signals.

12. The method of claim 11 further comprising the step of filtering the antenna output RF signal to remove out of band signals.

13. The method of claim 12 further comprising the step of amplifying the antenna output RF signal.

14. The method of claim 10 further comprising the step of amplifying the IF signal.

15. The method of claim 9 wherein the step of receiving comprises receiving the signals in each sector all in the same frequency band.

16. The method of claim 9 wherein the step of receiving comprises receiving signals in at least one of the sectors in signals in the other sectors.

* * * * *